(12) United States Patent
Knoller et al.

(10) Patent No.: US 11,110,921 B2
(45) Date of Patent: Sep. 7, 2021

(54) DRIVER ASSISTANCE SYSTEM IN A MOTOR VEHICLE

(71) Applicant: Bayerische Motoren Werke Aktiengesellschaft, Munich (DE)

(72) Inventors: Stefan Knoller, Munich (DE); Andreas Lechner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

(21) Appl. No.: 16/267,481

(22) Filed: Feb. 5, 2019

(65) Prior Publication Data

US 2019/0168755 A1      Jun. 6, 2019

Related U.S. Application Data

(63) Continuation of application No. PCT/EP2017/069529, filed on Aug. 2, 2017.

(30) Foreign Application Priority Data

Aug. 12, 2016   (DE) .................... 10 2016 215 120.7

(51) Int. Cl.
*B60W 30/16* (2020.01)
*B60W 50/00* (2006.01)
*B60W 50/14* (2020.01)

(52) U.S. Cl.
CPC ........ *B60W 30/16* (2013.01); *B60W 50/0097* (2013.01); *B60W 50/14* (2013.01);
(Continued)

(58) Field of Classification Search
CPC ....... B60W 2720/106; B60W 2555/60; B60W 50/0097; B60W 50/14; B60W 30/16; B60W 2540/215; B60W 2554/80
See application file for complete search history.

(56) References Cited

U.S. PATENT DOCUMENTS 6,405,132 B1 * 6/2002 Breed .................. G01S 7/4802
                                                       701/301
9,701,307 B1 * 7/2017 Newman ............. B60W 10/184
(Continued)

FOREIGN PATENT DOCUMENTS

CN       102649431 A       8/2012
CN       103661376 A       3/2014
(Continued)

OTHER PUBLICATIONS

International Search Report (PCT/ISA/210) issued in PCT Application No. PCT/EP2017/069529 dated Nov. 6, 2017 with English translation (seven pages).
(Continued)

*Primary Examiner* — Atul Trivedi
(74) *Attorney, Agent, or Firm* — Crowell & Moring LLP

(57) ABSTRACT

A driver assistance system in a motor vehicle has a detection system for identifying events ahead that, on account of a currently valid speed limit being lifted, allow the current speed to be increased, and a functional unit for ascertaining an at least two-stage acceleration strategy for increasing the speed, wherein the first stage of the acceleration strategy can be implemented at most up to the location of the event ahead and the second stage of the acceleration strategy can be implemented at the earliest starting from the location of the event ahead. The implementation is started at a defined time and/or location before the event ahead is reached if the implementation of the acceleration strategy is permitted. In the first stage of the two-stage acceleration strategy, the acceleration profile to be implemented is ascertained and/or prompted depending on an identified defined acceleration behavior of a relevant target object travelling ahead.

13 Claims, 3 Drawing Sheets

(52) U.S. Cl.
CPC ... *B60W 2540/215* (2020.02); *B60W 2554/80* (2020.02); *B60W 2555/60* (2020.02); *B60W 2720/106* (2013.01)

(56) References Cited

U.S. PATENT DOCUMENTS

| | | | |
|---|---|---|---|
| 2005/0010351 A1* | 1/2005 | Wagner | B60K 31/0008 701/96 |
| 2005/0134440 A1* | 6/2005 | Breed | G01S 17/89 340/435 |
| 2007/0021915 A1* | 1/2007 | Breed | G08G 1/164 701/301 |
| 2008/0272898 A1* | 11/2008 | Irion | B60Q 9/008 340/436 |
| 2010/0198450 A1 | 8/2010 | Shin | |
| 2011/0106364 A1 | 5/2011 | Braeuchle et al. | |
| 2012/0215415 A1 | 8/2012 | Schramm | |
| 2014/0088849 A1 | 3/2014 | Ham | |
| 2014/0114548 A1* | 4/2014 | Kagerer | B60W 30/16 701/96 |
| 2014/0371974 A1* | 12/2014 | Huelsebusch | G05D 13/00 701/23 |
| 2015/0203024 A1* | 7/2015 | Kagerer | B60W 50/14 702/158 |
| 2015/0224988 A1* | 8/2015 | Buerkle | B60W 30/0956 701/45 |
| 2016/0221575 A1* | 8/2016 | Posch | B60W 30/14 |
| 2017/0015319 A1* | 1/2017 | Knoller | B60W 30/146 |
| 2017/0144660 A1* | 5/2017 | Kagerer | B60W 10/04 |
| 2018/0370529 A1* | 12/2018 | Matsunaga | B60W 30/095 |
| 2019/0016335 A1* | 1/2019 | Kagerer | B60W 30/16 |
| 2020/0130662 A1* | 4/2020 | Buerkle | B60T 8/321 |

FOREIGN PATENT DOCUMENTS

| | | | |
|---|---|---|---|
| CN | 103857574 A | | 6/2014 |
| CN | 104925057 A | * | 9/2015 |
| CN | 105579320 A | | 5/2016 |
| DE | 103 19 337 A1 | | 11/2004 |
| DE | 10 2007 005 245 A1 | | 11/2007 |
| DE | 10 2008 018 421 A1 | | 9/2009 |
| DE | 10 2010 006 442 A2 | | 12/2010 |
| DE | 10 2014 215 671 A1 | | 2/2016 |
| EP | 2 712 781 A2 | | 4/2014 |
| FR | 2731659 A1 * | 9/1996 | .......... B60W 30/146 |
| FR | 2821803 A1 * | 9/2002 | ............. F16H 61/21 |
| WO | WO-2014083649 A1 * | 6/2014 | ........ B60W 30/0956 |
| WO | WO-2014083826 A1 * | 6/2014 | ........... B60W 10/04 |
| WO | WO 2016/020484 A2 | 2/2016 | |
| WO | WO-2016129231 A1 * | 8/2016 | ............. G08G 1/163 |

OTHER PUBLICATIONS

German-language Written Opinion (PCT/ISA/237) issued in PCT Application No. PCT/EP2017/069529 dated Nov. 6, 2017 (seven pages).

German-language Search Report issued in counterpart German Application No. 10 2016 215 120.7 dated Apr. 24, 2017 with partial English translation (11 pages).

Chinese-language Office Action issued in Chinese Application No. 201780045584.6 dated May 6, 2021 with English translation (14 pages).

* cited by examiner

DRIVER ASSISTANCE SYSTEM IN A MOTOR VEHICLE

CROSS REFERENCE TO RELATED APPLICATIONS

This application is a continuation of PCT International Application No. PCT/EP2017/069529, filed Aug. 2, 2017, which claims priority under 35 U.S.C. § 119 from German Patent Application No. 10 2016 215 120.7, filed Aug. 12, 2016, the entire disclosures of which are herein expressly incorporated by reference.

BACKGROUND AND SUMMARY OF THE INVENTION

The invention relates to a driver assistance system in a motor vehicle for determining an acceleration strategy and for automatically implementing the acceleration strategy.

In principle, a large number of driver assistance systems, designed as speed control systems, which regulate the speed of the motor vehicle to a predefined desired speed or setpoint speed are already known. In addition to these longitudinal control systems, longitudinal control systems which are expanded with a distance control feature, said systems being referred to as distance-related longitudinal control systems or speed control systems are now already available from some manufacturers. Such systems which are offered, for example, by the Applicant of the present invention under the designation "Active Cruise Control," make it possible to drive the motor vehicle automatically while maintaining a desired distance from a vehicle traveling ahead, at a desired or a correspondingly lower speed. If a distance sensor system which is mounted on the motor vehicle and which can operate, in particular, on the basis of radar, detects a target object or (motor) vehicle which is traveling ahead in the same lane as the motor vehicle in question, the speed of the motor vehicle in question is adapted, for example by bringing about a suitable braking torque, to the speed of the motor vehicle or target object which is traveling ahead, in such a way that a distance control feature, which is included in the "active speed control feature" or in the corresponding longitudinal control system, automatically sets a distance from the motor vehicle or target object traveling ahead which is appropriate for the situation, and maintains said distance. After the ending of the successive driving, the vehicle is accelerated again to the predefined desired speed.

Furthermore, in more recent vehicles driver assistance systems are offered which can predictively detect a speed limit either from map data of a navigation system and/or by means of image processing and display it permanently to the driver, with the result that the driver can autonomously adapt his speed to the speed limit when necessary (e.g. BMW speed limit info).

DE 10 2008 018 421 A1 discloses a driver assistance system for transmitting and receiving speed data and/or traffic density data for controlling a cruise control system which determines a reliable maximum speed by reference to the received data and communicates said maximum speed to the driver by outputting a corresponding indication. The driver can assume this predefinition for the reliable speed by means of a simple activation operation for his cruise control system. Likewise, when the speed limitation is exited, this is indicated to the driver.

DE 10 2014 215 671 A1 discloses a driver assistance system which detects events which lie ahead and which permit the current speed to be increased on the basis of cancelation of a currently valid speed limit. The driver assistance system also comprises a functional unit which, when it is detected that cancelation of a speed limit will occur ahead, determines a two-stage acceleration strategy and brings this about after approval has been given by the driver, even before the event which lies ahead and which cancels the current speed limitation has been reached. In this context, the first stage of the acceleration strategy is implemented up to the point when the event which lies ahead is reached, and the second stage of the acceleration strategy is implemented starting from the point when the event which lies ahead is reached. The acceleration strategy which is determined can be adapted continuously.

The object of the invention is then to make available a driver assistance system which, when a speed limitation ends, determines an acceleration strategy which can be comprehended by the driver and, if appropriate, implement it.

This and other objects are achieved by a driver assistance system according to the invention having at least two core elements:

(i) a sensing system for detecting events which lie ahead and which permit an increase in the current speed (to a new higher target speed) owing to cancelation of a currently valid speed limitation, and (ii) a functional unit for determining an at least two-stage acceleration strategy for increasing the speed, if an increase in the current speed is permitted or authorized owing to cancellation of a currently valid speed limitation, and for starting the implementation of the acceleration strategy (at the earliest) at a defined time and/or location before the event lying ahead is reached if the implementation of the acceleration strategy is permitted.

The relevant events which lie ahead and which permit the current speed to be increased can be detected either from map data of a navigation system and/or by way of image processing of a predictive sensor system and/or by way of a Car-to-X communication unit by receiving relevant data from other vehicles or from road signs or traffic control systems. The events lying ahead can therefore be, for example, the cancelation of temporary or permanent speed limits which are indicated either directly on a road sign or are to be derived therefrom on the basis of general traffic regulations (e.g. in Germany a speed limit of 50 km/h applies when traveling through a built up area). The target speed which is decisive for the acceleration strategy after the location of the event lying ahead can be either the (higher) maximum permitted speed subsequent to the cancelation sign or a speed which deviates in the upward or downward direction by a predefined absolute value, wherein the absolute value and the direction of the deviation can, for example, be capable of being influenced by the driver in a central vehicle menu. Likewise, the speed which is to be reached can also be a desired speed or setpoint speed which is predefined by the driver, in particular when the desired speed or setpoint speed which is predefined by the driver is lower than a maximum speed which is permitted after the event which cancels the current speed limitation.

The implementation of the acceleration strategy can be permitted or enabled in a basically automatic fashion, i.e. the driver assistance system is designed in such a way that it reacts automatically to a detected cancelation ahead of the speed limitation and correspondingly adapts speed. Alternatively there can be provision that the driver assistance system is designed in such a way that the implementation of the acceleration strategy which is determined is basically not approved until the driver has consented to the automatic implementation. For this purpose there can be provision that the driver can indicate in advance in a central setting menu that he consents to the automatic implementation always or in certain situations (e.g. on certain classes of road, in good weather conditions and/or depending on further parameters) or would like to consent to this implementation in each case on an individual basis when a corresponding driving situation occurs. At least in the cases in which the driver has not consented in advance to an automatic implementation, an indication system should additionally be provided for outputting a request indication to the driver to approve automatic implementation of the acceleration strategy, with the result that the driver is alerted to the possibility of enabling the automatic speed adaptation. The functional unit brings about the automatic implementation of the acceleration strategy by outputting corresponding control signals to the drive unit and/or brake unit only when the driver approves the automatic implementation of the acceleration strategy by correspondingly confirming the request indication.

The at least two-stage acceleration strategy which has already been mentioned above is composed of at least two stages, wherein the first stage of the acceleration strategy can be implemented at maximum up to the location of the event lying ahead, and the second stage can be implemented at the earliest starting from the location of the relevant event ahead. Thus, in other words, at the location of the event lying ahead, at which the currently valid speed limitation is canceled, switching over is performed from the first acceleration program (=first stage of the two-stage acceleration strategy) to a second acceleration program (=second stage of the two-stage acceleration strategy). The first stage can be configured in such a way that in the normal situation when implementation is approved the acceleration is set precisely in such a way that at the location of the cancelation sign the speed limitation which ends there is not exceeded (or only by a small absolute value, which can be adjusted under certain circumstances). The second acceleration program is, in contrast, set after the cancelation sign in such a way that the acceleration to the new target speed takes place, on the one hand, in a comfortable fashion, but at the same time also the difference in speed is applied as quickly as possible. With a correspondingly selected acceleration in the two acceleration programs it is therefore possible to ensure that the driver already experiences a slight acceleration of the vehicle up to the cancelation sign, and the vehicle is accelerated to the new, higher target speed, only starting from the cancelation sign.

In contrast to the acceleration in the first stage, in the second stage of the two-stage acceleration strategy such an acceleration can be brought about that a target speed which is permitted or desired after the cancelation of the speed limitation is reached within the shortest possible time or with a predefined time window, wherein a predefined maximum acceleration must advantageously not be exceeded. In this context, in the second stage of the two-stage acceleration strategy, the acceleration can advantageously be predefined as a function of the difference in speed between a current speed and a target speed which is permitted or desired after the cancelation of the speed limitation and/or as a function of a current operating mode of the vehicle (e.g. sporty mode, comfort mode or ECO mode).

Within the scope of the two-stage acceleration strategy when predefining the acceleration, any possible intervention into the transmission controller can advantageously also be taken into account, with the result that a predefined or intended transmission control is complied with. Therefore, in the first stage of the two-stage acceleration strategy such an acceleration can be requested that shifting down of the transmission of the vehicle is avoided or such an intervention into the transmission control of the vehicle is performed that a shifting down request which is possibly present owing to the acceleration request is prohibited. In contrast to this, in the second stage of the two-stage acceleration strategy such an acceleration can be requested that shifting down of the transmission is requested and implemented, i.e. an acceleration is deliberately requested that requires shifting down of the transmission. The first acceleration is therefore set gently and a corresponding dynamic impression is promoted only at the location of the event lying ahead (at the transition into the second acceleration stage) by the shifting down.

Basically, when the acceleration strategy is determined it is possible to also take into account, in addition to the decisive boundary conditions such as e.g. difference in speed between the current speed and the target speed, distance from the location of the decisive event lying ahead and/or desired target speed, further criteria which have an influence on the acceleration effects of the vehicle. The influencing factors can be, in particular, current influencing factors, but it is also possible to take into account already known influencing factors which will occur in future and influence the acceleration and will occur up to the location of the event lying ahead or else in the subsequent acceleration phase. For example, these can be the inclination of the road, wind conditions and other weather conditions, the current cargo of the vehicle or the like.

The invention is then based on the following recognition: if the vehicle in question is in a traffic situation with cancelation ahead of a speed limit and if in front of the vehicle there is a further vehicle which already accelerates very early (owing to the cancelation ahead of the speed limit) or accelerates before the motor vehicle in question, the impression of a sluggish acceleration behavior, not appropriate for the situation, of the driver assistance system can arise for the driver of the vehicle. In order to counteract such an impression, there is provision according to the invention that in the first stage of the two-stage acceleration strategy the acceleration profile which is to be implemented and/or the maximum permitted acceleration is determined and/or brought about as a function of acceleration behavior of a relevant object traveling ahead. The acceleration which is to be taken into account during the conventional distance control and which is basically to be complied with is not to be understood as a defined acceleration behavior of the target object but rather an explicitly defined acceleration behavior, that is to say a defined type of acceleration behavior.

In this context, in the first stage of the two-stage acceleration strategy, the acceleration profile which is to be implemented is advantageously determined and/or brought about continuously and/or adaptively as a function of the detected defined acceleration behavior of the target object traveling ahead before the event lying ahead is reached, in particular as a function of the detected defined acceleration behavior of the target object traveling ahead during a defined time interval and/or distance interval before the event lying ahead is reached. The time interval and/or distance interval can be defined in such a way that they begin at the earliest starting from the location or time at which the event lying ahead is detected or at which implementation of a previously determined acceleration strategy could be started or is started, and end when the location and/or the time at which the relevant event is reached is reached. In other words, a correspondingly early initiated and/or high acceleration of the target object traveling ahead is taken into account during the determination of the acceleration strategy, in particular during the determination of the acceleration behavior to be implemented, in the first stage of the acceleration strategy, only when the acceleration takes place before the relevant event is reached, in particular during a defined time interval and/or distance interval before the relevant event is reached.

In one advantageous development of the invention, when a relevant target object which is traveling ahead and which satisfies a feature which characterizes the degree of acceleration (before the detected relevant event is reached) is detected, in the first stage of the acceleration strategy a higher acceleration of the vehicle is approved and implemented than when a target object is not present or when a target object which does not satisfy a criterion which characterizes the degree of acceleration is present. A criterion which characterizes the degree of acceleration can be satisfied e.g. when the relevant object accelerates significantly, that is to say to a considerable degree. A significantly accelerating target object can be understood to be e.g. a vehicle which is traveling ahead and which accelerates at least in such a way that an acceleration of the vehicle in question before the relevant event is reached would be possible or a higher acceleration of the vehicle in question would be possible than has (previously) been determined for the first stage of the acceleration strategy. In other words, it is checked whether the acceleration of the vehicle or target object traveling ahead is higher than the communicated acceleration (permitted up to now) of the vehicle in question.

Therefore, when a relevant target object which is traveling ahead and which satisfies a criterion which characterizes the degree of acceleration is detected before the implementation of the acceleration strategy has been started and/or while the first stage of the acceleration strategy is being implemented, the first stage of the acceleration strategy is determined and/or adapted in such a way that an earlier and/or higher acceleration of the vehicle up to the point when the relevant location is reached than when a target object is not present or when a target object which does not satisfy a criterion which characterizes the degree of acceleration is present is approved or predefined and/or implemented.

When acceleration of the vehicle in question is increased during the first stage of the acceleration strategy owing to a target object which is accelerating in such a way that it satisfies a criterion which characterizes the degree of acceleration, the maximum approved acceleration and/or the predefined and initiated relatively high acceleration can advantageously be predefined as a function of further parameters, in particular as a function of the selected driving mode of the vehicle (e.g. ECO, NORMAL or SPORTY) and/or the distance of the motor vehicle in question or of the significantly accelerating target object from the relevant event lying ahead and/or the time until the motor vehicle in question or the target object is assumed to reach the relevant event lying ahead, and/or the difference in speed between the motor vehicle in question and the target object and/or the difference in acceleration between the motor vehicle and the target object.

As an alternative to or in addition to the earlier and/or higher acceleration of the vehicle during the first stage of the acceleration strategy in the case of a "significantly" accelerating target object before the relevant event is reached, it is possible given the same situation in the first stage of the two-stage acceleration strategy to bring about such an acceleration that at the location of the relevant event the speed limitation which is canceled there is exceeded by a predefined speed absolute value, wherein the speed absolute value or the speed which is to be reached can be predefined at the location of the relevant event (likewise) as a function of the defined acceleration behavior of the target object (before or up to the location of the relevant event). The speed absolute value is advantageously higher here than when a target object is not present or when a target object which does not satisfy a criterion which characterizes the degree of acceleration is present, i.e. a (higher) speed than in the case of a target object which is not "significantly" accelerating is approved or reached at the location of the relevant event. In one development of this embodiment variant, the speed absolute value in the case of a significantly accelerating target object can also be predefined as a function of further parameters, in particular as a function of the selected driving mode of the vehicle (e.g. ECO, NORMAL or SPORTY) and/or the distance of the motor vehicle in question or of the significantly accelerating target object from the relevant event lying ahead and/or the time period until the motor vehicle in question or the target object is assumed to reach the relevant event lying ahead and/or the difference in speed between the motor vehicle in question and the target object and/or the difference in acceleration between the motor vehicle and the target object.

For the sake of completeness it is also to be noted that the second stage of the acceleration strategy is always determined independently of the detected acceleration behavior, in particular always determined in the same way even when a defined acceleration behavior is detected.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
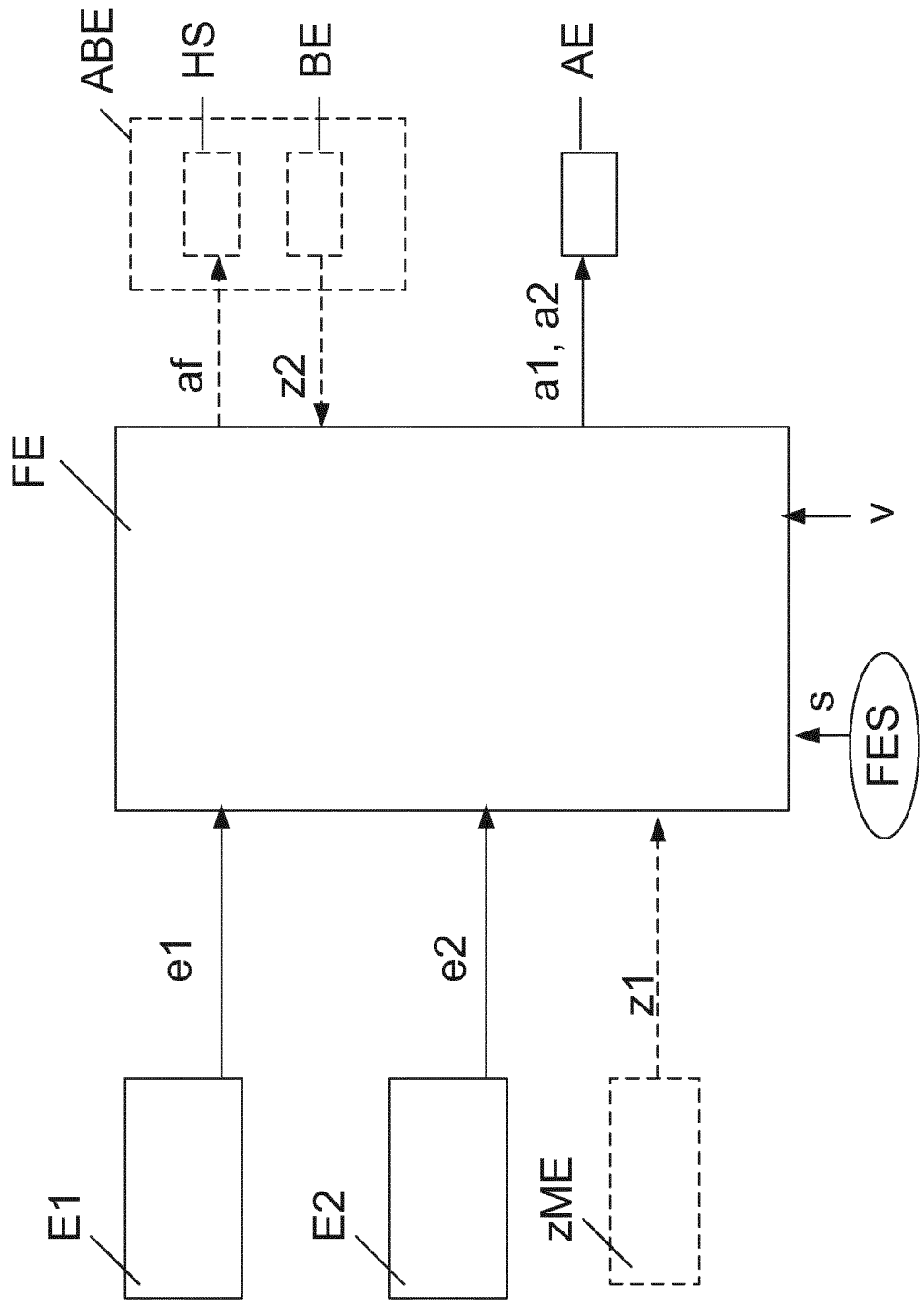
FIG. 1 is a schematic block diagram of an exemplary design of a driver assistance system in a motor vehicle for determining an acceleration strategy and automatically implementing the acceleration strategy.

FIG. 1 shows in detail as a central element of the driver assistance system a functional unit FE which receives input signals e1 of a first sensing unit E1, input signals e2 of a second sensing unit E2, a speed signal v, a status signal s of a driving experience switch FES and (optionally) an approval signal z1 or z2 for approving automatic implementation of a determined acceleration strategy.

The first sensing unit E1 can be, for example, a (video) sensor system which is mounted on the vehicle and oriented toward the front and which detects events which lie ahead and which cancel a speed limit and approve an increase in the current speed to a relatively high target speed, and relevant target vehicles traveling ahead. The second sensing unit E2 can be, for example, a vehicle-internal navigation system which detects, as a function of the known position of the vehicle and a section of route lying ahead, events which lie ahead and which cancel a speed limit. Both the first sensing unit E1 and the second sensing unit E2 are configured in such a way that they can detect, on the one hand, the location of the event which lies ahead and which cancels a speed limit as well as the magnitude of the actual speed limit and can pass it on to the functional unit FE. Ideally, the sensing units E1 or E2 also detect a new permissible maximum speed which is valid after the current speed limitation is canceled. Alternatively, a desired (new) maximum speed which is predefined by the driver can be transmitted to the functional unit FE instead of the new approved maximum speed.

Furthermore, given a corresponding selection by the driver, the functional unit FE receives from a central menu unit zME arranged in the vehicle a signal z1 which indicates that the driver basically desires automatic implementation of the determined acceleration strategy. However, the driver can alternatively also select that the implementation of the determined acceleration strategy does not basically take place automatically (a signal z1 is not transmitted to the functional unit) but instead only when the driver approves this in a corresponding traffic situation by actuating the operator control element BE. In this context, the driver would receive in good time before a correspondingly relevant situation is reached, in an indication system HS which is integrated in a display operator control unit ABE, an indication, by transmission of a signal af, of the imminent possibility of automatic adaptation of the speed on the basis of the relevant event lying ahead. During the outputting of the indication, the driver can confirm the request by activating an operator control element BE which is provided for this purpose and can approve the automatic implementation of the determined acceleration strategy (signal z2).

Finally, the functional unit FE also receives further relevant data s, from which it can determine which driving mode is currently selected. As an example, the functional unit FE is connected here to what is referred to as a driving experience switch FES by means of which the driver can select an operating mode of the vehicle. If the driver has selected, for example, the sporty mode, he basically desires faster acceleration and, if appropriate, also that the permitted maximum speed at the location of the cancelation sign is exceeded to a greater extent than if the driver has selected what is referred to as an eco mode in which he would like to drive and also to accelerate in a particularly economic fashion in terms of consumption.

As soon as relevant data e1 and/or e2 about an event which lies ahead and which cancels a speed limit and information about the new target speed which is desired after the cancelation sign are present at the functional unit FE, the functional unit FE can firstly determine the (intermediate) target speed at the location of the event lying ahead, which target speed can, if appropriate, be higher by a specific speed absolute value than the previously applicable speed limitation, and subsequently determine, as a function of the permitted acceleration in a first acceleration stage which is to be implemented up to the point when the cancelation sign is reached, taking into account the selected driving mode s, an acceleration strategy for the first acceleration stage up to the point when the event lying ahead is reached, and an acceleration for a second stage which is to be implemented starting from the point when the relevant event is reached.

Starting from the time when the relevant event which lies ahead is detected, the functional unit FE already monitors continuously whether a relevant target object which satisfies a criterion which characterizes the degree of acceleration, that is to say e.g. accelerates significantly, before the relevant event is reached, is located in front of the vehicle in question. A significant acceleration is detected if the acceleration of the relevant target object exceeds the reduced acceleration of the vehicle in question. Reference is always made below to a "significantly accelerating target object", but any other type of target object which satisfies a criterion which characterizes the degree of acceleration is also to be included in this.

If such a situation with a significantly accelerating target object is detected by reference to data e1 (and e2), this is taken into account during the determination of the first stage of the acceleration strategy. In particular, when such a situation is detected, the first stage of the acceleration strategy is determined and/or adapted in such a way that a higher acceleration is approved or initiated even before the previously envisaged location (if the implementation of the acceleration strategy has not yet been started) or at the latest at the previously envisaged location, that is to say in a traffic situation in which a significantly accelerating vehicle has not been detected. If a relevant target object then only accelerates "significantly" when the implementation has already started, the previously determined and already started first stage of the acceleration strategy is correspondingly adapted, with the result that a higher acceleration than the previously determined or predefined acceleration of the vehicle is initiated. During the determination of the acceleration strategy, in particular during the determination of the first stage of the acceleration strategy, the maximum permitted speed at the location of the relevant event can additionally be adapted as a function of the presence of a detected significantly accelerating target object. It is therefore possible e.g. when a significantly accelerating target object is detected, to approve a higher maximum permitted speed than in traffic situations in which there is not a target object which is accelerating significantly.

Depending on the determined acceleration strategy which is, if appropriate, adapted to changed peripheral conditions, the functional unit brings about, at the determined starting time, the start of implementation of the acceleration strategy by means of a signal a1 to the drive unit AE when this is approved (signal z1 or z2 is present). If the distance between the vehicle and the cancelation sign is very short at the time at which the driver approves the automatic implementation by activating the operator control element BE, with the result that it would only be possible to reach the somewhat higher (intermediate) target speed with high acceleration, the vehicle can be accelerated only with a relatively low acceleration irrespective of the permitted (intermediate) target speed at the location of the cancelation sign.

As soon as the cancelation sign is reached, the functional unit FE brings about implementation of the (previously) determined second stage of the two-stage acceleration strategy by outputting a second acceleration signal a2 to the drive unit AE, with the result that the target speed is reached in accordance with the requirements of the driver and taking into account a maximum permitted acceleration within a very short time.

Figure 2:
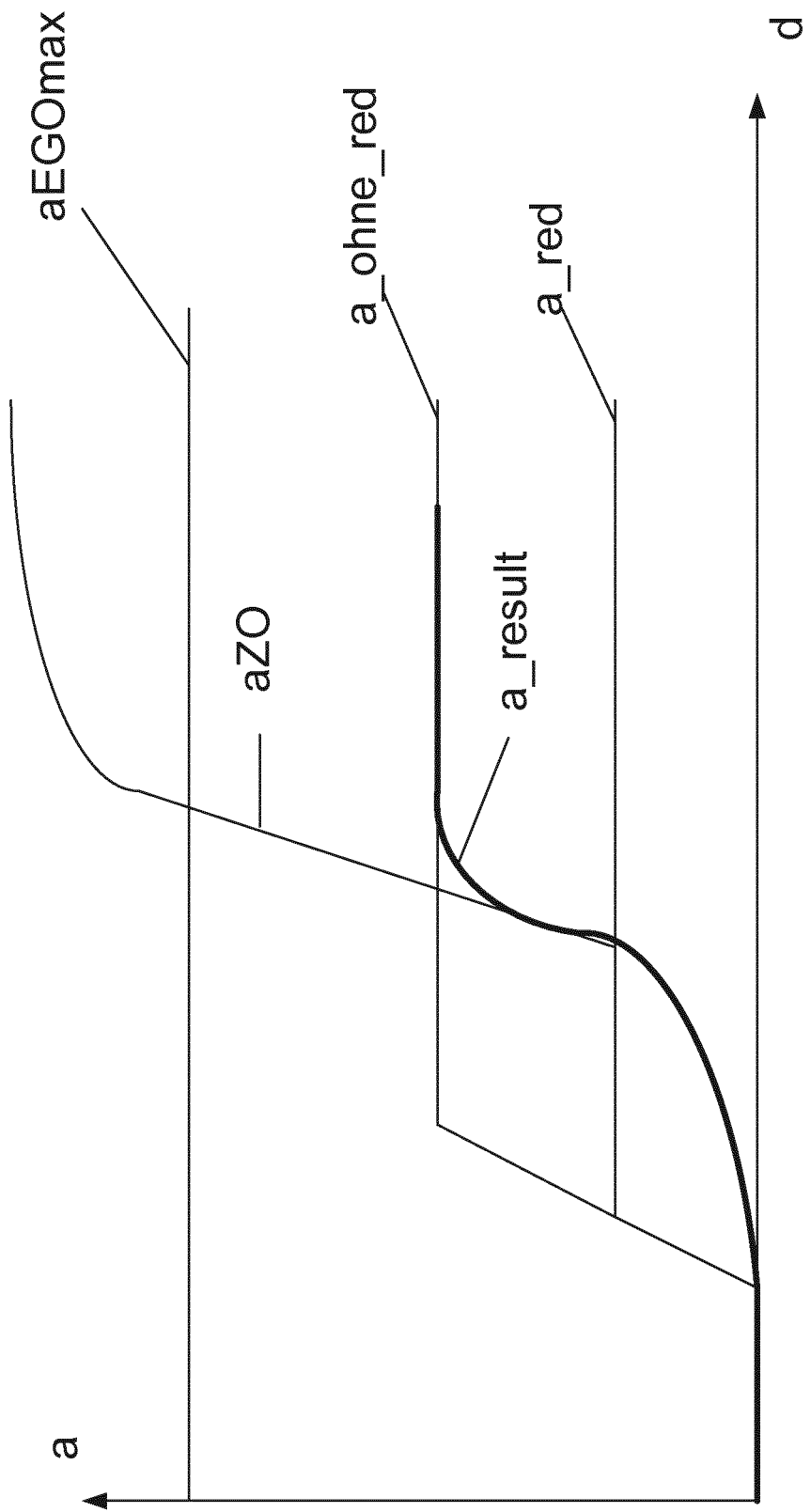
FIG. 2 is a graph illustrating an acceleration profile of the motor vehicle in question when a speed limitation is canceled and a target object is present with a detected defined acceleration behavior before the relevant event is reached.

FIG. 2 shows an automatically initiated acceleration profile of the vehicle in question when a speed limitation is canceled and a target object is present with a detected defined acceleration behavior before the relevant event is reached.

In the characteristic diagram which spans a distance d and an acceleration a of the vehicle, the line aEGOmax shows the maximum permitted acceleration for automatic acceleration processes. The line a_red shows the maximum approved automatic acceleration of the vehicle when cancelation of a speed limitation and approved automatic acceleration is detected, up to the point when the end of the speed limitation is reached, that is to say in the first stage of the acceleration strategy, on condition that there is no target object present which is traveling ahead or that no target object which is traveling ahead and has a defined significant acceleration behavior is detected. However, if a target object with a defined significant acceleration behavior is detected during the first acceleration stage, that is to say before the event which cancels the speed limitation is reached, a higher acceleration of the vehicle is approved in the first acceleration stage. The higher maximum approved acceleration is characterized by the line a_ohne_red.

The acceleration characteristic curve aZO now shows an acceleration behavior of a target object traveling ahead. The acceleration characteristic curve a_result shows an acceleration profile of the vehicle in question which occurs when it is detected during the implementation of the first stage of the acceleration strategy that a target object which is traveling ahead accelerates in accordance with the illustrated acceleration behavior aZO in such a way that the acceleration of the target object is higher than the (mainly) maximum permitted reduced acceleration a_red during the implementation of the acceleration strategy.

Firstly, the vehicle in question accelerates in this context in the same way as the target object traveling ahead. However, if the target object exceeds not only the maximum approved reduced acceleration a_red (which forms the upper limit of the maximum approved acceleration when a target object is not present or there is a target object which is not accelerating significantly), but also the maximum approved acceleration a_ohne_red which also must not be exceeded when a significantly accelerating target object is detected, the acceleration a_result of the vehicle in question is changed in such a way that the vehicle is no longer accelerated to the same degree as the target object but rather only with the now applicable higher maximum approved acceleration a_ohne_red.

Figure 3:
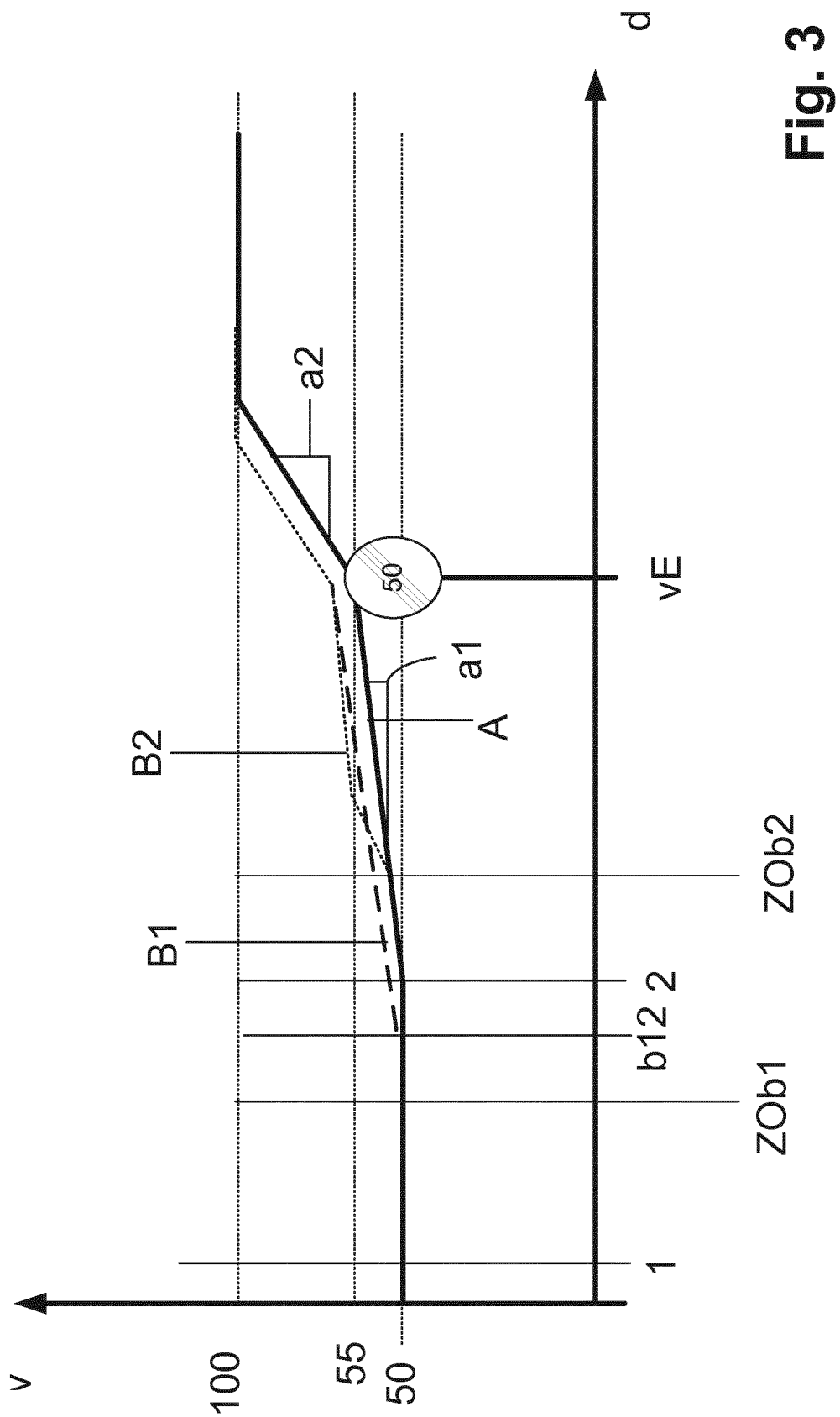
FIG. 3 is a graph showing a plurality of examples of determined and automatically implemented acceleration strategies with and without a significantly accelerating target object.

A plurality of examples of implemented two-stage acceleration strategies will now be illustrated with reference to the following description relating to FIG. 3. FIG. 3 shows a distance d, wherein a cancelation sign of a speed limit of 50 km/h is arranged at the location vE. After the cancelation sign, a vehicle is to be driven at a target speed of 100 km/h which is predefined by the driver.

Furthermore, it is assumed that the vehicle which is approaching the cancelation sign is moving at a constant speed of 50 km/h. Finally, it is also assumed that the driver desires, by means of a corresponding vehicle setting, automatic adaptation of the speed on the basis of detected relevant events.

At the time at which the vehicle has reached the position "1", the event vE lying ahead is detected and a corresponding acceleration strategy for adapting the vehicle speed is determined in order to reach the (setpoint) speed applicable after the cancelation sign.

In the first example (continuous line A) it is assumed that a traffic situation without a target object traveling ahead is present. Here, the automatic implementation of the determined acceleration strategy is started at the location "2". In this context, the vehicle firstly accelerates with a predefined first acceleration a1, with the result that at the location vE of the cancelation sign a small upward transgression of the permissible maximum speed (50 km/h) is reached. Starting from the location vE of the cancelation sign the functional unit changes from the first acceleration stage into the second acceleration stage. Within the scope of this second acceleration stage, the vehicle is accelerated with an acceleration a2 which is increased compared to the first acceleration a1, with the result that the desired target speed of 100 km/h is reached within a very short time. The magnitude of the first or second acceleration a1 or a2 can be predefined either permanently or as a function of the current operating mode.

In the second example (dashed line B1) it is assumed that a traffic situation with a target object traveling ahead is present, wherein the target object accelerates significantly, that is to say to an increased degree, at the position ZOb1. Owing to the significantly accelerating target object, the 1$^{st}$ stage of the acceleration strategy which is already previously determined is adapted in such a way that the automatic implementation of the adapted acceleration strategy can already be started before the location 2, specifically at the location b12. In this context, the vehicle firstly accelerates with a correspondingly higher acceleration than in example 1, with the result that at the location vE of the cancelation sign a greater upper transgression of the permissible maximum speed (still 50 km/h) is achieved. Starting from the location vE of the cancelation sign, the functional unit changes from the first acceleration stage into the second acceleration stage which is identical to the second acceleration stage from example A.

In the third example (dotted line B2) it is assumed that a traffic situation with a target object traveling ahead is present, wherein the target object accelerates significantly, that is to say to an increased degree, at the position ZOb2. This significant acceleration of the target object therefore does not occur until the implementation of the (previously) determined acceleration strategy has already started at the location 2. Here, the first stage of the acceleration strategy is adapted directly or soon after the detection of the significant acceleration of the target object in such a way that a higher acceleration (in comparison with example A) is permitted and implemented. In a fashion analogous to example B1, it is also approved in this example that a higher upward transgression of the permissible maximum speed (still 50 km/h) is achieved at the location vE of the cancelation sign. Starting from the location vE of the cancelation sign, the functional unit changes from the first acceleration stage into the second acceleration stage which is identical to the second acceleration stage from example A.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle, comprising:
   a sensing system that detects events which lie ahead and which permit an increase in a current speed of the motor vehicle owing to cancelation of a currently valid speed limitation; and
   a functional unit that determines an at least two-stage acceleration strategy to increase the speed of the motor vehicle, wherein
      a first stage of the acceleration strategy is implementable at maximum up to a location of the event lying ahead, and
      a second stage of the acceleration strategy is implementable at earliest starting from the location of the event lying ahead, wherein implementation is started at a defined time and/or location before the event lying ahead is reached if the implementation of the acceleration strategy is permitted, and in the first stage of the two-stage acceleration strategy to increase the speed of the motor vehicle, an acceleration profile to be implemented is determined and/or brought about as a function of a detected defined acceleration behavior of a relevant target object traveling ahead.

2. The driver assistance system as claimed in claim 1, wherein
in the first stage of the two-stage acceleration strategy, the acceleration profile which is to be implemented is determined and/or brought about as a function of the defined acceleration behavior of the relevant target object traveling ahead, before the event lying ahead is reached.

3. The driver assistance system as claimed in claim 1, wherein
in the first stage of the two-stage acceleration strategy, the acceleration profile which is to be implemented is determined and/or brought about as a function of the defined acceleration behavior of the target object traveling ahead, during a defined time interval and/or distance interval before the event lying ahead is reached.

4. The driver assistance system as claimed in claim 1, wherein
the defined acceleration behavior of the target object traveling ahead is detected when a relevant target object which is traveling ahead and which satisfies a criterion which characterizes the degree of acceleration is detected.

5. The driver assistance system as claimed in claim 4, wherein
a criterion which characterizes the degree of acceleration is the relative acceleration of the target object with respect to the determined acceleration, to be implemented, of the vehicle in question in the first stage of the two-stage acceleration strategy, and
the criterion is satisfied if the acceleration of the target object is higher than the determined acceleration, to be implemented, of the vehicle in question, in the first stage of the two-stage acceleration strategy.

6. The driver assistance system as claimed in claim 1, wherein
in the first stage of the two-stage acceleration strategy, a higher acceleration can be implemented when a relevant target object which is traveling ahead and which satisfies a criterion which characterizes the degree of acceleration is detected than when a target object is not present or when a target object which does not satisfy a criterion which characterizes the degree of acceleration is present.

7. The driver assistance system as claimed in claim 1, wherein
when a relevant target object which is traveling ahead and which satisfies a criterion which characterizes the degree of acceleration is detected, the determined first stage of the acceleration strategy is determined or adapted such that an earlier start of implementation of the acceleration strategy and/or a higher acceleration up to the point when the event which lies ahead is reached is predefined and brought about than when a target object is not present or when a target object which does not satisfy a criterion which characterizes the degree of acceleration is present.

8. The driver assistance system as claimed in claim 6, wherein
a maximum approved acceleration and/or relatively high acceleration which has been predefined and brought about when a relevant target object which is traveling ahead and which satisfies a criterion which characterizes the degree of acceleration is detected is predefined as a function of further parameters.

9. The driver assistance system as claimed in claim 6, wherein
a maximum approved acceleration and/or relatively high acceleration which has been predefined and brought about when a relevant target object which is traveling ahead and which satisfies a criterion which characterizes the degree of acceleration is detected is predefined as a function of one or more of: the selected driving mode(s), the distance of the target object from the event lying ahead, the time until the target object reaches the event lying ahead, the difference in speed between the motor vehicle and the target object, and the difference in acceleration between the motor vehicle and the target object.

10. The driver assistance system as claimed in claim 1, wherein
in the first stage of the two-stage acceleration strategy an acceleration is brought about such that at the location of the event lying ahead the speed limitation which is canceled there is exceeded by a predefined speed absolute value, wherein the speed absolute value is predefinable as a function of the defined acceleration behavior of the target object which is traveling ahead, until the relevant location is reached.

11. The driver assistance system as claimed in claim 10, wherein
when a relevant target object which is traveling ahead and which satisfies a criterion which characterizes the degree of acceleration is detected, a higher speed absolute value is approved and/or can be predefined than when a target object is not present or when a target object which does not satisfy a criterion which characterizes the degree of acceleration is present.

12. The driver assistance system as claimed in claim 10, wherein
when a relevant target object which is traveling ahead and which satisfies a criterion which characterizes the degree of acceleration is detected, the speed absolute value is predefined as a function of further parameters.

13. The driver assistance system as claimed in claim 10, wherein
when a relevant target object which is traveling ahead and which satisfies a criterion which characterizes the degree of acceleration is detected, the speed absolute value is predefined as a function of one or more of: the selected driving mode(s), the distance of the target object from the event lying ahead, the time period until the target object reaches the event lying ahead, the difference in speed between the motor vehicle and the target object, the difference in acceleration between the motor vehicle and the target object.

* * * * *